(12) United States Patent
Deng et al.

(10) Patent No.: US 12,172,204 B2
(45) Date of Patent: Dec. 24, 2024

(54) HEATED GUIDE TRACK FOR A PRESS MACHINE FOR MANUFACTURING A STRIP

(71) Applicant: TE Connectivity Services GmbH, Schaffhausen (CH)

(72) Inventors: Xinping Deng, Lancaster, PA (US); David D. Wiltraut, Palmyra, PA (US); Jason L. Hamburger, Elizabethtown, PA (US)

(73) Assignee: TE Connectivity Solutions GmbH (CH)

( * ) Notice: Subject to any disclaimer, the term of this patent is extended or adjusted under 35 U.S.C. 154(b) by 677 days.

(21) Appl. No.: 16/740,000

(22) Filed: Jan. 10, 2020

(65) Prior Publication Data
US 2021/0213510 A1   Jul. 15, 2021

(51) Int. Cl.
*B21D 28/26*    (2006.01)
*B21D 37/16*    (2006.01)

(52) U.S. Cl.
CPC .............. *B21D 28/26* (2013.01); *B21D 37/16* (2013.01)

(58) Field of Classification Search
CPC ...... B21D 22/022; B21D 28/26; B21D 37/16; B21D 22/208; B21D 1/00; C21D 9/562; C21D 9/62; C21D 9/56
USPC ............. 432/230, 231, 8; 266/104; 219/155; 226/196.1
See application file for complete search history.

(56) References Cited

U.S. PATENT DOCUMENTS

| | | | |
|---|---|---|---|
| 453,162 A * | 5/1891 | Ries | C21D 9/62 266/112 |
| 1,706,741 A * | 3/1929 | Pugh | H02K 41/025 226/93 |
| 1,817,902 A * | 8/1931 | Schumacher | C21D 9/573 266/108 |
| 1,839,613 A * | 1/1932 | Metzger | F27D 11/02 373/117 |
| 2,275,274 A * | 3/1942 | Wallace | B21B 45/004 219/155 |
| 2,319,300 A * | 5/1943 | Cook | C21D 9/56 266/108 |
| 2,319,302 A * | 5/1943 | Cook | C21D 9/56 432/59 |

(Continued)

FOREIGN PATENT DOCUMENTS

| | | | | |
|---|---|---|---|---|
| CN | 107262596 A | * | 10/2017 | ............. B21D 28/26 |
| CN | 108380761 A | * | 8/2018 | ........... B21D 22/022 |

(Continued)

OTHER PUBLICATIONS

Translation De 102018206343A1; Opfer et al. Oct. 2019.*

(Continued)

*Primary Examiner* — Edward T Tolan

(57) ABSTRACT

A press machine includes a frame, a punch die supported by the frame, a guide track supported by the frame, and a heater coupled to the guide track. The punch die is driven through a punch stroke to punch a strip advanced through the press machine at a punch zone. The guide track has a guide rail forming a guide channel configured to receive the strip. The guide channel is aligned with the punch zone to guide the strip to the punch zone. The heater heats the guide rail to an elevated operating temperature. The guide rail is used for conduction heating of the strip as the strip passes through the guide track.

20 Claims, 3 Drawing Sheets

(56) References Cited

U.S. PATENT DOCUMENTS

| | | | | |
|---|---|---|---|---|
| 2,371,459 | A * | 3/1945 | Mittelmann | H05B 6/40 219/645 |
| 2,441,500 | A * | 5/1948 | Miess | C21D 9/62 266/104 |
| 2,957,688 | A * | 10/1960 | Luecke | C21D 9/56 83/273 |
| 2,980,411 | A * | 4/1961 | Buckholdt | C21D 9/56 226/91 |
| 3,152,383 | A * | 10/1964 | Steigerwalt | B21D 1/00 29/17.5 |
| 3,525,847 | A * | 8/1970 | Dudek | C21D 1/40 219/155 |
| 3,843,894 | A * | 10/1974 | Hunt | C25D 7/0607 307/145 |
| 4,090,058 | A * | 5/1978 | Kielhorn | H05B 3/0009 219/156 |
| 4,142,062 | A * | 2/1979 | Wentworth | F27D 11/02 373/134 |
| 4,475,881 | A * | 10/1984 | Borst | B29C 51/262 425/384 |
| 4,805,440 | A * | 2/1989 | Lenders | B21D 28/14 72/433 |
| 4,973,244 | A * | 11/1990 | Deambrosio | H05K 3/3494 432/59 |
| 4,987,281 | A * | 1/1991 | Yao | H05B 3/0009 219/116 |
| 6,830,634 | B2 * | 12/2004 | Herzer | C21D 9/56 148/121 |
| 8,459,084 | B2 * | 6/2013 | Krajewski | B21D 24/16 148/714 |
| 2009/0174125 | A1 * | 7/2009 | Ekman | F27B 17/00 266/249 |
| 2013/0312478 | A1 * | 11/2013 | Kobayashi | B21D 22/022 72/342.6 |
| 2017/0066030 | A1 * | 3/2017 | Frost | B21D 22/022 |
| 2017/0175222 | A1 * | 6/2017 | Stillger | B21D 37/08 |
| 2018/0001367 | A1 * | 1/2018 | Chiriac | B21D 53/88 |

FOREIGN PATENT DOCUMENTS

| | | | | |
|---|---|---|---|---|
| DE | 939704 C | * | 3/1956 | C21D 9/62 |
| DE | 102014111501 A1 | * | 2/2016 | B21D 22/022 |
| DE | 102018206343 A1 | * | 10/2019 | C21D 9/48 |
| KR | 20130068486 A | * | 6/2013 | B21D 22/022 |
| KR | 201300068486 A | * | 6/2014 | B21D 22/022 |

OTHER PUBLICATIONS

Translation Cn 107262596A; Wu et al. Oct. 2017.*
WO 2015/185852A1, Maillard et al. Dec. 2015.*
WO 03/76096A1, Hu et al. Sep. 2003.*

* cited by examiner

HEATED GUIDE TRACK FOR A PRESS MACHINE FOR MANUFACTURING A STRIP

BACKGROUND OF THE INVENTION

The subject matter herein relates generally to press machines.

Press machines are used to process strips of material, such as for punching openings in the strips, for cutting out portions of the strips, for stamping the strips, for forming the strips, and the like. The press machine includes punch dies that are used to process the strip during the pressing operation. Typically, the strips are arranged on a spool, which are unwound to pass the strip through the press machine. However, because the strips are wound on the spool and stored in the wound state, the strips develop curvature based on the spools diameter. The curvature of the strip is detrimental, leading to inaccurate processing of the strip. For example, the curvature may lead to incorrect positioning of the punch dies relative to the strip (for example, incorrect positioning of holes punched in the strip). Some known processes straighten the strip prior to advancing the strip to the press machine. For example, the strip is unwound and advanced through a heat treatment process where the strip is heated, straightened and then cooled at a heat treatment station prior to advancing the strip to the press machine. Heating the strip at the heat treatment station adds cost to the overall manufacturing process, such as the cost of the heating and cooling machines, energy cost in operating the heating and cooling machines, space cost in the facility, time cost in the additional processing step, and the like. Some known processes reheat the strip prior to advancing the strip to the press machine, which adds additional heating time and expense.

A need remains for a cost effective press machine for manufacturing material strips.

BRIEF DESCRIPTION OF THE INVENTION

In one embodiment, a press machine is provided including a frame, a punch die supported by the frame, a guide track supported by the frame, and a heater coupled to the guide track. The punch die is driven through a punch stroke to punch a strip advanced through the press machine at a punch zone. The guide track has a guide rail forming a guide channel configured to receive the strip. The guide channel is aligned with the punch zone to guide the strip to the punch zone. The heater heats the guide rail to an elevated operating temperature. The guide rail is used for conduction heating of the strip as the strip passes through the guide track.

In one embodiment, a guide track is provided for guiding a strip to a punch die of a press machine. The guide track includes a guide rail including a bottom wall, a first side wall and a second side wall forming a guide channel. The guide rail extends between a first end and a second end. The guide rail receives the strip at the first end, the second end facing the punch die. The guide track includes a heater operably coupled to the guide rail. The heater heats the guide rail to an elevated operating temperature for conduction heating the strip as the strip passes through the guide channel.

In one embodiment, a method of manufacturing a strip is provided including pulling the strip through a guide channel of a guide track to a punch die of a press machine, heating the guide track to an elevated operating temperature for conduction heating the strip as the strip passes through the guide channel, and punching the heated strip with the punch die. The method may include directly engaging the strip with the guide track at the elevated operating temperature to raise a temperature of the strip as the strip is pulled through the guide channel to the punch die of the press machine. The method may include straightening the strip by constraining horizontal and vertical movement of the strip in the guide track as the strip is pulled through the guide channel. The method may include cooling the strip after the heated strip is punched with the punch die.

DETAILED DESCRIPTION OF THE INVENTION

Figure 1:
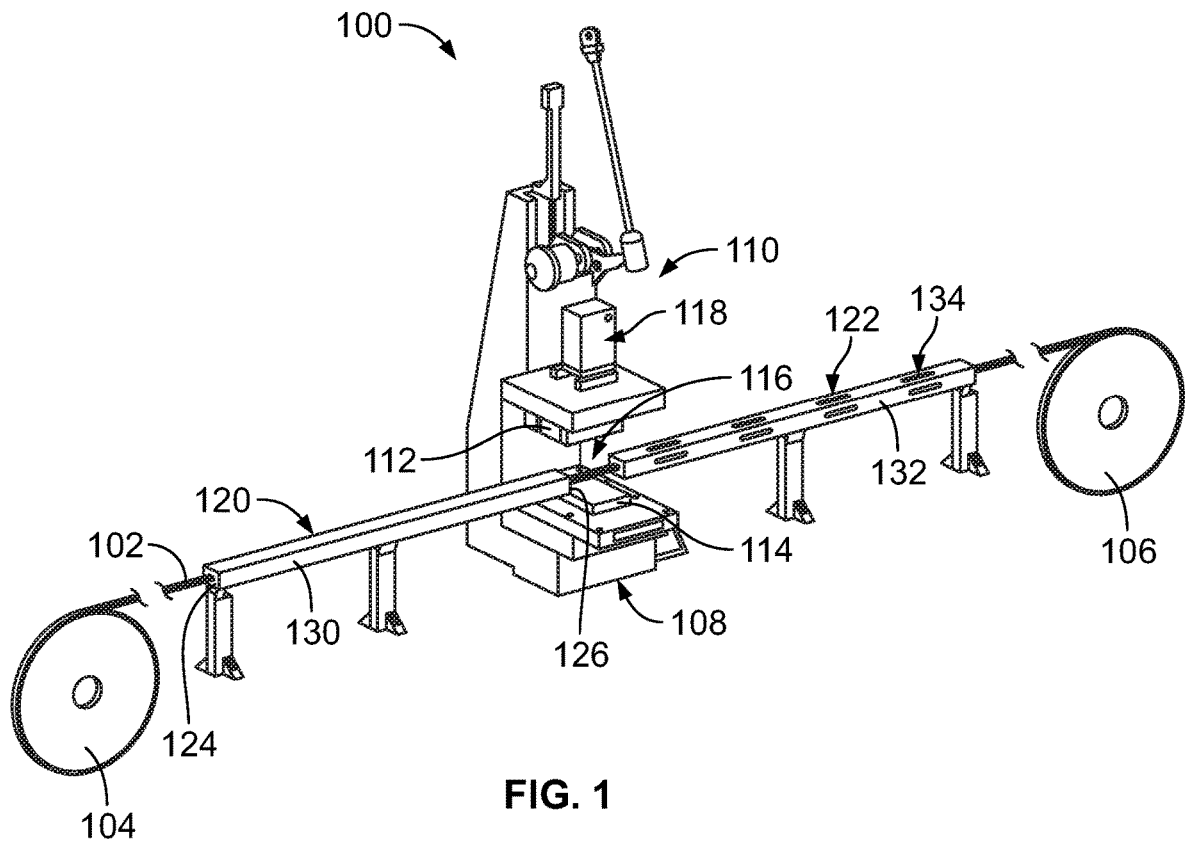
FIG. 1 illustrates a press machine for manufacturing a strip in accordance with an exemplary embodiment.
Figure 2:
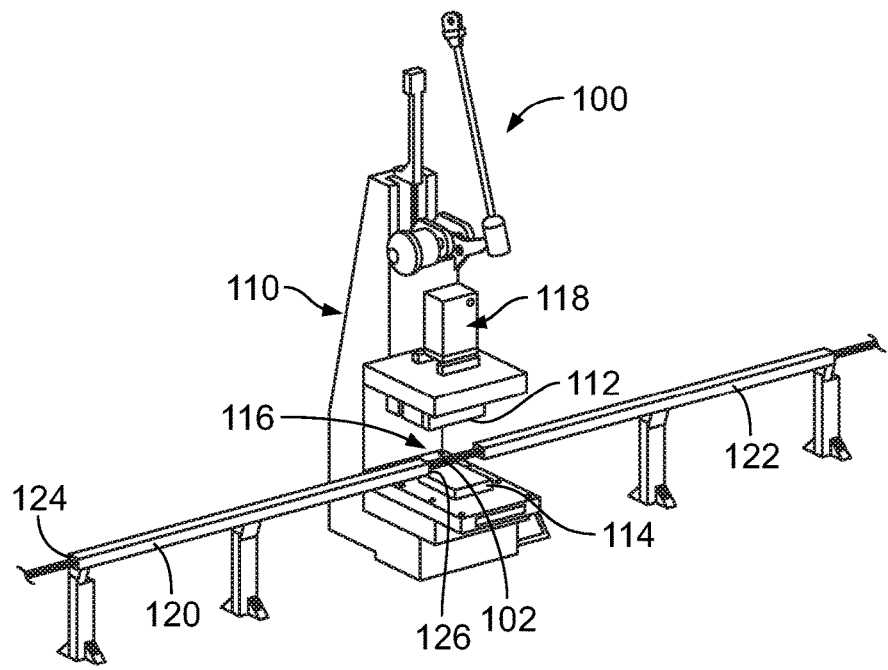
FIG. 2 illustrates a portion of the press machine in accordance with an exemplary embodiment.

FIG. 1 illustrates a press machine 100 for manufacturing a strip 102 in accordance with an exemplary embodiment. FIG. 2 illustrates a portion of the press machine 100 in accordance with an exemplary embodiment. The press machine 100 is used for punching and/or stamping and/or cutting and/or forming the strip 102 during a manufacturing process. In various embodiments, the strip 102 may be a metal strip, such as a metal strip used to form electrical contacts. Other types of strips 102 may be used in alternative embodiments, such as a plastic strip. For example, the strip 102 may be a glass filled plastic strip. In an exemplary embodiment, the strip 102 is a continuous strip used for multiple components, such as contacts. The press machine 100 is used as a processing station in a reel to reel application. For example, the strip 102 is wound on a spool 104 and advanced through the press machine 100 by a take-up spool 106. The strip 102 may be advanced through other processing stations between the spool 104 and the take-up spool 106 during manufacture. The press machine 100 includes a frame 108 configured to support other components of the press machine 100.

The press machine 100 includes a punch die 110 for processing the strip 102. The punch die 110 is supported by the frame 108. In an exemplary embodiment, the punch die 110 includes an upper die member 112 and a lower die member 114 opposing each other at a punch zone 116. At least one of the upper die member 112 and the lower die member 114 are movable relative to each other during a punching operation. In various embodiments, the lower die member 114 is stationary and the upper die member 112 is movable toward and away from the lower die member 114. In other various embodiments, the upper die member 112 is stationary and the lower die member 114 is movable toward and away from the upper die member 112. In other various embodiments, both the upper die member 112 and the lower die member 114 are movable toward and away from each other. In an exemplary embodiment, the press machine 100 includes an actuator for actuating the upper die member 112 and/or the lower die member 114. For example, the actuator 118 may be an electric ram, a hydraulic ram, a pneumatic ram, and the like. In other various embodiments, the actuator 118 may be hand actuated, such as including a handle. The upper die member 112 and the lower die member 114 are sized and shaped for processing the strip 102. For example, the upper die member 112 and/or the lower die member 114 may be used for stamping, punching, forming, cutting, or otherwise processing the strip 102 at the punch zone 116. In various embodiments, the upper die member 112 and/or the lower die member 114 may be removable and replaceable, such as with the die members 112, 114 are worn, or when the punch die 110 is to be used with a different type or size of strip 102, or when the punch die 110 is to be used for a different punching operation.

The press machine 100 includes a guide track 120 (FIG. 2) positioned upstream of the punch die 110, which may be referred to hereinafter as an upstream guide track 120. The guide track 120 is supported by the frame 108. The guide track 120 extends a length between a first end 124 and a second end 126. The guide track 120 is used to guide the strip 102 to the punch die 110. The guide track 120 may receive the strip 102 from the spool 104 or from another processing station. For example, the guide track 120 receives the strip 102 from the spool 104 at the first end 124. The guide track 120 positions the strip 102 relative to the punch zone 116, such as controlling horizontal positioning and vertical positioning relative to the punch zone 116. In an exemplary embodiment, the guide track 120 is positioned immediately upstream of the punch zone 116 such that the guide track 120 supports the strip 102 relative to the punch die 110. For example, the strip 102 exits the guide track 120 at the second end 126 directly into the punch zone 116.

In various embodiments, the press machine 100 may include a guide track 122 (FIG. 2) positioned downstream of the punch die 110, which may be referred to hereinafter as an exit guide track 122. The guide track 122 is supported by the frame 108. The exit guide track 122 is used to guide the strip 102 away from the punch die 110. For example, the exit guide track 122 may guide the strip 102 to the take-up spool 106 or to another processing station. The exit guide track 122 may be positioned immediately downstream of the punch die 110 to support the strip 102 relative to the punch die 110.

In an exemplary embodiment, the press machine 100 includes a heater 130 (shown in FIG. 1 and removed in FIG. 2 to illustrate the guide track 120) coupled to the guide track 120. The heater 130 is used to heat the guide track 120 to an elevated operating temperature. The heated guide track 120 is used for conduction heating of the strip 102 upstream of the punch die 110. The heated strip 102 exits the guide track 120 into the punch die 110. The heater 130 is used for heat straightening the strip 102 upstream of the punch die 110. The strip 102 goes through a heating cycle to gradually straighten as the strip 102 passes through the guide track 120, prior to the punching process. The heater 130 may include a heat plate, a tube heater, a radiant heater, an IR heater, or another type of heating device for heating the guide track 120.

In an exemplary embodiment, the press machine 100 includes a cooling module 132 (shown in FIG. 1 and removed in FIG. 2 to illustrate the exit guide track 122) coupled to the exit guide track 122. The cooling module 132 is used to cool the strip 102 as the strip 102 passes through the exit guide track 122. Cooling of the strip 102 occurs after the punching process at the punch die 110. The cooling may occur gradually as the strip 102 passes along the exit guide track 122. The cooling module 132 may include air vents 134 and/or a heat sink for passive cooling of the strip 102. In other various embodiments, the cooling module 132 may actively cool the exit guide track 122, such as using a cold plate having cooling fluid flowing therethrough, or other heat dissipating elements to lower the temperature of the exit guide track 122, and thus the strip 102 passing through the exit guide track 122.

Figure 3:
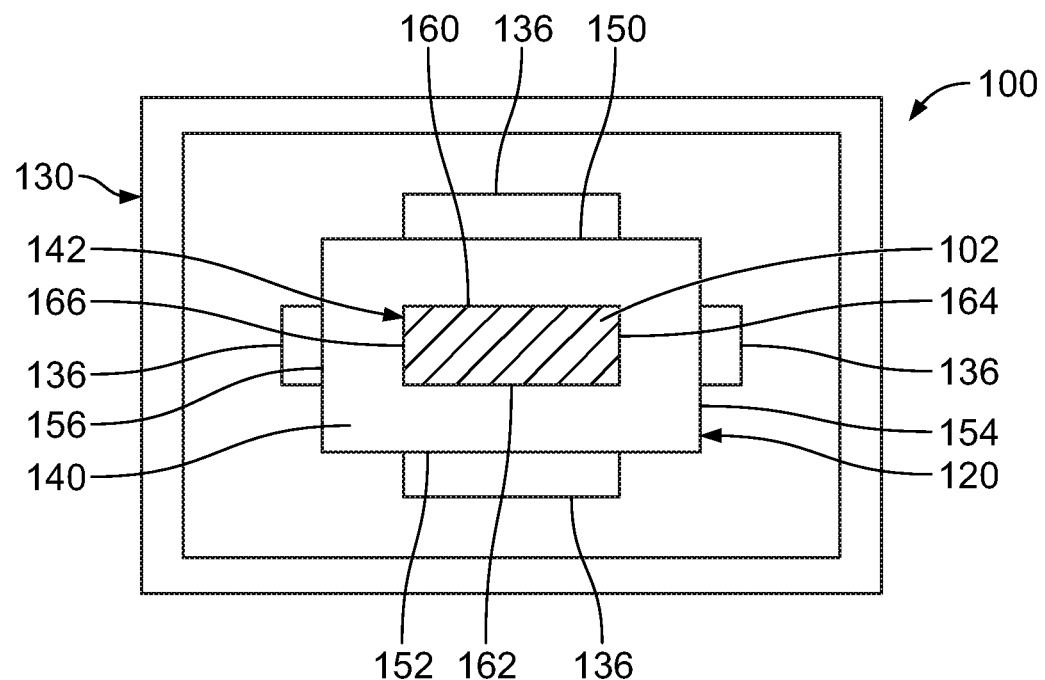
FIG. 3 is an end view of a portion of the press machine showing the strip in a guide track of the press machine.

FIG. 3 is an end view of a portion of the press machine 100 showing the strip 102 in the guide track 120. FIG. 3 illustrates the heater 130 coupled to the guide track 120. The guide track 120 includes a guide rail 140 forming a guide channel 142 that receives the strip 102. The guide rail 140 constrains the strip 102 to straighten the strip 102 as the strip 102 passes through the guide channel 142. The heater 130 heats the guide rail 140 to an elevated operating temperature, which is transferred to the strip 102 for heat straightening the strip 102. In an exemplary embodiment, the guide rail 140 directly engages the strip 102 to heat the strip 102 to the elevated operating temperature by direct contact heating of the strip 102. In an alternative embodiment, the strip 102 is spaced apart from at least one inner wall of the guide channel 142. In this alternative embodiment, the strip 102 is heated by a combination of radiant heating and direct contact or conduction heating.

The guide rail 140 includes a top wall 150, a bottom wall 152 opposite the top wall 150, a first side wall 154 extending between the top wall 150 and the bottom wall 152, and a second side wall 156 opposite the first side wall 154 extending between the top wall 150 and the bottom wall 152. The top wall 150, the bottom wall 152, the first side wall 154, and the second side wall 156 form the guide channel 142. The top wall 150, the bottom wall 152, the first side wall 154, and the second side wall 156 encircle the guide channel 142. In an exemplary embodiment, the guide rail 140 is tube-shaped with the guide channel 142 being enclosed by the guide rail 140. The guide rail 140 may include other walls in alternative embodiments, such as to form a guide channel having a different shape. In various embodiments, one or more of the walls of the guide rail 140 may include openings therethrough, such as to receive portions of the strip 102 and/or to position portions of the strip 102 exterior of the guide track 120. For example, the second side wall 156 may include a slot or opening extending the length of the guide rail 140. The slot or opening would allow a portion of the strip 102 to pass through the guide rail 140. In an alternative embodiment, the top wall 150 and/or the bottom wall 152 may include an opening extending the length of the guide rail 140 forming ledges above and/or below the strip 102 to constrain the strip 102 in the guide channel 142.

In an exemplary embodiment, the top wall 150 and the bottom wall 152 vertically constrain the strip 102. The strip 102 is straightened between the top wall 150 and the bottom wall 152. For example, the top wall 150 and/or the bottom wall 152 straighten vertical bends in the strip 102. In an exemplary embodiment, the first side wall 154 and the second side wall 156 horizontally constrain the strip 102. The strip 102 is straightened between the first side wall 154 and the second side wall 156. For example, the first side wall 154 and/or the second side wall 156 straighten horizontal bends in the strip 102.

In an exemplary embodiment, the heater 130 is thermally coupled to the guide rail 140. For example, the heater 130 may include one or more heating elements 136 for heating the guide rail 140. The heating elements 136 may be thermally coupled to the top wall 150 and/or the bottom wall 152 and/or the first side wall 154 and/or the second side wall 156. The heating elements 136 are used to elevate an operating temperature of the guide rail 140. The guide rail 140 is thermally coupled to the strip 102 for conduction heating of the strip 102. For example, the heat in the top wall 150 is thermally transferred to an upper surface 160 of the strip 102; the heat in the bottom wall 152 is thermally transferred to a lower surface 162 of the strip 102; the heat in the first side wall 154 is thermally transferred to a first edge 164 of the strip 102; and the heat in the second side wall 156 is thermally transferred to a second edge 166 of the strip 102. The strip 102 may be uniformly heated throughout by the guide rail 140. Alternatively, the heater 130 or heating elements 136 are controlled such that the heating elements 136 can have varying amounts of heat or no heat. For example, the top wall 150 and the first side wall 154 can be heated while the bottom wall 152 and the second side wall 156 are not heated or have a different amount of heat. Thus, all walls of the guide rail 140 can be heated in various combinations and be heated independently from each other. The guide rail 140 is used to elevate the temperature of the strip 102 for heat straightening of the strip 102. In an exemplary embodiment, the heating elements 136 may extend substantially an entire length of the guide rail 140 for heating the guide rail 140 along the entire length of the guide track 120. Other types of heating elements may be used in alternative embodiments.

Figure 4:
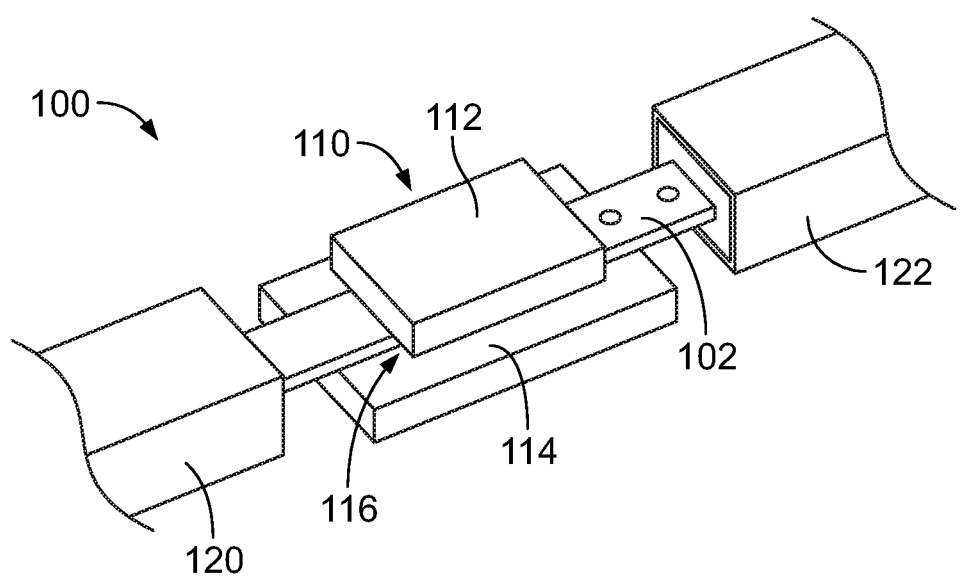
FIG. 4 is a perspective view of a portion of the press machine in accordance with an exemplary embodiment.

FIG. 4 is a perspective view of a portion of the press machine 100 in accordance with an exemplary embodiment. FIG. 4 illustrates the guide track 120 and the exit guide track 122 on opposite sides of the punch die 110. The strip 102 passes between the guide track 120 and the exit guide track 122. The strip 102 passes through the punch die 110 for processing the strip 102 at the punch die 110. In an exemplary embodiment, the strip 102 exits the guide track 120 directly into the punch zone 116 between the upper and lower die members 112, 114. In an exemplary embodiment, the strip 102 exits the punch zone 116 directly into the exit guide track 122. The strip 102 goes through a heating cycle as the strip 102 passes through the guide track 120. The strip 102 goes through a cooling cycle as the strip 102 passes through the exit guide track 122. The punching operation occurs after the strip 102 is heated. The punching operation occurs prior to cooling the strip 102.

Figure 5:
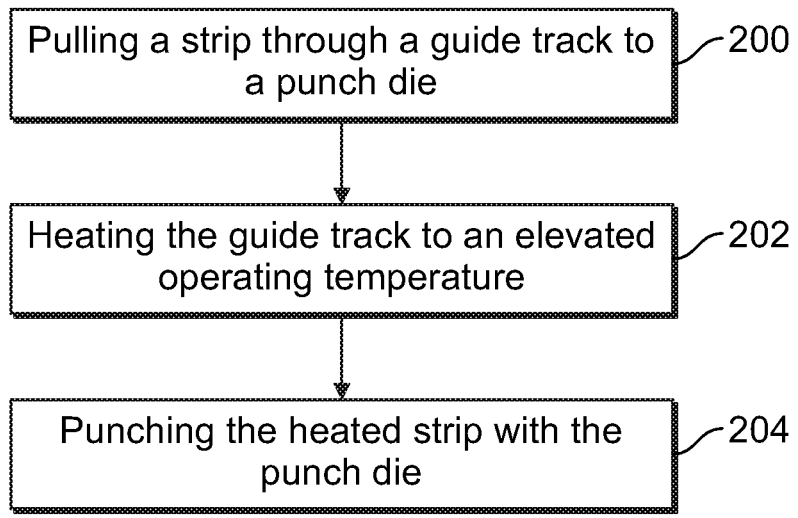
FIG. 5 is a flowchart of a method of manufacturing the strip in accordance with an exemplary embodiment.

FIG. 5 is a flowchart of a method of manufacturing the strip 102 in accordance with an exemplary embodiment. At 200, the method includes pulling the strip 102 through a guide channel 142 of a guide track 120 to a punch die 110 of a press machine 100. The strip 102 may be pulled through the press machine 100 using the spool 104 and the take-up spool 106. The strip 102 may be continuously pulled through the press machine 100. The strip 102 is pulled under tension through the guide track 120 and the punch die 110. The tension in the strip 102 is used to straighten the strip 102 as the strip 102 is pulled through the guide track 120.

At 202, the method includes heating the guide track 120 to an elevated operating temperature. The guide track 120 is heated by a heater 130, such as including heating elements 136 directly thermally coupled to the guide track 120 to heat the guide track 120. The guide track 120 is used for conduction heating the strip 102 as the strip 102 passes through the guide channel 142. For example, the guide track 120 directly engages the strip 102 for direct contact heating of the strip 102. In various embodiments, the guide track 120 includes a guide rail 140 having a top wall 150, a bottom wall 152 opposite the top wall 150, a first side wall 154 extending between the top wall 150 and the bottom wall 152, and a second side wall 156 opposite the first side wall 154 extending between the top wall 150 and the bottom wall 152. The method includes heating the top wall 150 and/or the bottom wall 152 and/or the first side wall 154 and/or the second side wall 156 to elevate the temperature of the guide rail 140. The walls of the guide rail 140 are used to heat the strip 102, such as by direct contact with surfaces of the strip 102. The method may include directly engaging the strip 102 with the guide track 120 at the elevated operating temperature to raise a temperature of the strip 102 as the strip 102 is pulled through the guide channel 142 to the punch die 110 of the press machine 100. The method may include straightening the strip 102 by constraining horizontal and vertical movement of the strip 102 in the guide track 120 as the strip 102 is pulled through the guide channel 142.

At 204, the method includes punching the heated strip 102 with the punch die 110. The strip 102 is punched after being heated and prior to being cooled. The strip 102 is punched by pressing an upper die member 112 and/or a lower die member 114 of the punch die 110 into the strip 102 to punch an opening through the strip 102, or to cut out portions of the strip 102, or to form the strip 102 to change the shape of the strip 102, and the like. The method may include cooling the strip 102 after the heated strip 102 is punched with the punch die 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A press machine comprising:
   a frame;
   a punch die supported by the frame, the punch die being driven through a punch stroke to punch a strip advanced through the press machine at a punch zone;
   a guide track supported by the frame, the guide track having a guide rail fixed relative to the frame, the guide rail forming a guide channel configured to receive the strip, the guide rail extending between a first end and a second end to support the strip, the guide rail configured to support the strip between the first end and the second end while allowing the strip to be pulled through the guide track from the first end to the second end, the guide rail engaging a bottom of the strip to support the strip at a bottom of the guide track along an entire length of the guide rail between the first end and the second end to vertically constrain the strip within the guide channel, the guide rail engaging sides of the strip to support the strip at sides of the guide track along the entire length of the guide rail between the first end and the second end to horizontally constrain the strip within the guide channel, the guide rail configured to receive the strip at the first end, the second end facing the punch die, the guide channel being aligned with the punch zone to guide the strip to the punch zone; and a heater coupled to the guide track, the heater heating the guide rail to an elevated operating temperature, the guide rail engaging the strip at the bottom and the sides of the strip for conduction heating the strip along the length of the guide rail between the first and second ends as the strip passes through the guide track to increase a temperature of the strip as the strip passes through the guide track.

2. The press machine of claim 1, wherein the guide track constrains the strip as the strip is pulled through the guide channel to straighten the strip.

3. The press machine of claim 1, wherein the punch die punches the heated strip prior to cooling the strip.

4. The press machine of claim 1, wherein the guide track is positioned immediately upstream of the punch die, the guide track directing the heated strip into the punch zone.

5. The press machine of claim 1, wherein the guide rail directly engages the strip to heat the strip to the elevated operating temperature.

6. The press machine of claim 1, wherein the guide rail includes a bottom wall, a first side wall, and a second side wall, at least one of the bottom wall, the first side wall, and the second side wall engaging the strip for direct contact heating of the strip.

7. The press machine of claim 6, wherein the guide rail includes a top wall opposite the bottom wall, the strip being vertically constrained by the top wall and the bottom wall, the strip being horizontally constrained by the first side wall and the second side wall.

8. The press machine of claim 6, wherein at least one of the bottom wall, the first side wall and the second side wall is spaced apart from the strip for radiant heating of the strip.

9. The press machine of claim 1, wherein the guide track extends a length between a first end and a second end, the heater heating the length of the guide track between the first end and the second end.

10. The press machine of claim 1, wherein the heater is controlled to vary an amount of heating of the guide track.

11. The press machine of claim 1, further comprising an exit guide track downstream of the punch die, the exit guide track constraining the strip to straighten the strip after the punch die punches the strip.

12. The press machine of claim 1, further comprising a spool holding the strip, the strip being pulled from the spool into the guide track.

13. A guide track for guiding a strip to a punch die of a press machine, the guide track comprising:

a guide rail including a guide channel, the guide rail extending between a first end and a second end fixed relative to the first end, the guide rail configured to support the strip between the first end and the second end while allowing the strip to be pulled through the guide track from the first end to the second end, the guide rail receiving the strip at the first end, the second end facing the punch die, the guide rail engaging a bottom of the strip to support the strip at a bottom of the guide rail along an entire length of the guide rail between the first end and the second end to vertically constrain the strip within the guide channel, the guide rail engaging sides of the strip to support the strip at sides of the guide track along the entire length of the guide rail between the first end and the second end to horizontally constrain the strip within the guide channel;

a heater operably coupled to the guide rail, the heater heating the guide rail to an elevated operating temperature for conduction heating the strip at the bottom and the sides of the strip along the length of the guide rail between the first and second ends as the strip passes through the guide channel to increase a temperature of the strip as the strip passes through the guide track.

14. The guide track of claim 13, wherein the guide rail is an upstream guide rail including a bottom wall, a first side wall and a second side wall forming the guide channel, the guide track further comprising a downstream guide rail including a bottom wall, a first side wall, and a second side wall forming a downstream guide channel receiving the strip, the heater being operably coupled to the upstream guide rail.

15. The guide track of claim 13, wherein the guide rail directly engages at least one side of the strip to heat the strip to the elevated operating temperature.

16. The guide track of claim 13, wherein the guide rail includes a bottom wall, a first side wall and a second side wall forming the guide channel, the guide rail including a top wall opposite the bottom wall, the strip being vertically constrained by the top wall and the bottom wall, the strip being horizontally constrained by the first side wall and the second side wall, the heater heating the top wall, the bottom wall, the first side wall, and the second side wall for direct contact heating of the strip.

17. A method of manufacturing a strip using a press machine, the method comprising:

pulling the strip through a guide channel of a guide track between a first end and a second end of the guide track to a punch die at a punch zone of the press machine, the guide channel being fixed relative to and aligned with the punch zone to guide the strip to the punch zone, the guide track engaging a bottom of the strip to support the strip at a bottom of the guide track along an entire length of the guide rail between the first end and the second end to vertically constrain the strip within the guide channel as the stirp is pulled through the guide channel, the guide track engaging sides of the strip to support the strip at sides of the guide track along the entire length of the guide rail between the first end and the second end to horizontally constrain the strip within the guide channel as the strip is pulled through the guide channel;

heating the guide track to an elevated operating temperature for conduction heating the strip at the bottom and the sides of the strip along the length of the guide rail between the first and second ends as the strip passes through the guide channel;

punching the heated strip at a punch zone with the punch die that is driven through a punch stroke.

18. The method of claim 17, further comprising straightening the strip by constraining horizontal and vertical movement of the strip in the guide track as the strip is pulled through the guide channel.

19. The method of claim 17, further comprising cooling the strip after the heated strip is punched with the punch die.

20. The method of claim 17, further comprising directly engaging the strip with the guide track at the elevated operating temperature to raise a temperature of the strip as the strip is pulled through the guide channel to the punch die of the press machine.

\* \* \* \* \*